US005148184A

United States Patent [19]

Fujiwara et al.

[11] Patent Number: 5,148,184

[45] Date of Patent: Sep. 15, 1992

[54] METHOD OF CONTROLLING PRINTED DENSITY IN THERMAL TRANSFER RECORDING

[75] Inventors: Yoshihisa Fujiwara, Kadoma; Hirokazu Genno, Hirakata, both of Japan

[73] Assignee: Sanyo Electric Co., Ltd., Osaka, Japan

[21] Appl. No.: 687,968

[22] Filed: Apr. 19, 1991

[30] Foreign Application Priority Data

Apr. 23, 1990 [JP] Japan ................................ 2-107220

[51] Int. Cl.[5] ........................ G01D 9/00; G01D 15/00

[52] U.S. Cl. ................................ 346/1.1; 346/76 PH; 358/298

[58] Field of Search ........................... 346/76 PH, 1.1; 358/298

[56] References Cited

U.S. PATENT DOCUMENTS 4,680,646 7/1987 Ikeda et al. ......................... 358/298

4,985,779 1/1991 Gall ..................................... 358/298

FOREIGN PATENT DOCUMENTS 62-85444 5/1987 Japan .

*Primary Examiner*—Benjamin R. Fuller

*Assistant Examiner*—Huan Tran

*Attorney, Agent, or Firm*—Darby & Darby

[57] ABSTRACT

A method of controlling printed density in thermal transfer recording, comprising the steps of: obtaining from first data representing, for each of a plurality of densities, a sum of absolute values of differences between a reference density corresponding to each of the densities and actual printed densities of the respective heating resistors, in response to input of gradational transfer data at a transfer density selected from one of the densities, fourth data representing the sum of absolute values at the density of the inputted gradational transfer data; multiplying third data representing the differences between a reference density corresponding to each of the densities and actual printed densities of the respective heating resistors at a specific one of the densities by a ratio of the fourth data to second data representing the first data at the specific one of the densities so as to obtain amounts of density correction for the heating resistors, respectively at the transfer density; and correcting the gradational transfer data by the amounts of density correction so as to drive the heating resistors on the basis of the gradational transfer data subjected to density correction such that transfer recording is performed.

9 Claims, 5 Drawing Sheets

METHOD OF CONTROLLING PRINTED DENSITY IN THERMAL TRANSFER RECORDING

BACKGROUND OF THE INVENTION

The present invention relates to a method of controlling printed density in a sublimation type thermal transfer recording apparatus enabling recording of multiple gradations.

A thermal transfer recording apparatus is known from, for example, Japanese Utility Model Laid-Open Publication No. 62-85444 in which a platen roller and a thermal head having a plurality of heating resistors arranged in a line are brought into pressing contact with each other and a recording medium and an ink sheet are overlapped so as to be inserted in between the platen roller and the thermal head such that printing of multiple gradations is performed on the recording medium by heating desired ones of the heating resistors. In the case where printing of uniform density is performed on the recording medium by using the known thermal transfer recording apparatus, printed density on the recording medium in a main scanning direction extending in parallel with the line of the heating resistors on the thermal head becomes nonuniform.

FIGS. 1(*a*) to 1(*f*) show printed density nonuniformities at various printed densities, respectively in the known thermal transfer recording apparatus. For example, the indication "20th gr." of FIG. 1(*a*) represents printed density at the 20th gradation counted from the lightest gradation in case the known thermal transfer recording apparatus enables printing of 128 gradations. It will be understood from FIGS. 1(*a*) to 1(*f*) that printed density nonuniformities at the respective printed densities have a substantially similar shape in the main scanning direction but a sum of absolute values of differences between a reference printed density and actual printed densities varies greatly according to the printed densities.

It is considered that printed density nonuniformity is caused by dispersion in resistance values of the heating resistors on the thermal head, improper flatness of a glazed layer of each heating resistor, defective flatness of the platen roller which is disposed in pressing contact with the heating resistors such that the recording medium is interposed therebetween, etc.

In order to correct printed density nonuniformity caused by dispersion of resistance values of the heating resistors, a method is proposed in which the resistance values of the heating resistors are measured and data on errors between the measured resistance values and a predetermined resistance value is stored in a read-only memory (ROM) such that printed density is corrected by sequentially fetching the error data from the ROM at the time of printing.

However, it is time-consuming and expensive to measure the resistance values of the heating resistors and input the error data into the ROM. Meanwhile, since other causes of printed density nonuniformity are not removed, corrected printing does not achieve desired density.

SUMMARY OF THE INVENTION

Accordingly, an essential object of the present invention is to provide a method of controlling printed density in sublimation type thermal transfer recording, which eliminates the disadvantages inherent in the conventional methods.

In order to accomplish this object of the present invention, a method of controlling printed density in thermal transfer recording in which a platen roller and a thermal head having a plurality of heating resistors confronting the platen roller are brought into pressing contact with each other and a recording medium and an ink sheet are overlapped so as to be inserted in between the platen roller and the thermal head such that ink of the ink sheet is transferred onto the recording medium, according to the present invention comprises the steps of: obtaining from first data representing, for each of a plurality of densities, a sum of absolute values of differences between a reference density corresponding to each of the densities and actual printed densities of the respective heating resistors, in response to input of gradational transfer data at a transfer density selected from one of the densities, fourth data representing said sum of absolute values at the density of the inputted gradational transfer data; multiplying third data representing the differences between a reference density corresponding to each of the densities and actual printed densities of the respective heating resistors at a specific one of the densities by a ratio of said fourth data to second data representing said first data at the specific one of the densities so as to obtain amounts of density correction for the heating resistors, respectively at the transfer density; and correcting the gradational transfer data by the amounts of density correction so as to drive the heating resistors on the basis of the gradational transfer data subjected to density correction such that transfer recording is performed.

In the method of the present invention, printing of uniform density is performed at each of a plurality of densities and printed density nonuniformity in the main scanning direction on the recording medium is read by a color scanner such that the relation between the desired printed density and the sum of the absolute values of the differences between the reference printed density and the actual printed densities in the heating resistors is obtained for each of the densities.

Then, the ratio of the sum corresponding to the specific desired printed density to be employed for printing, to the sum corresponding to the proper desired printed density is obtained from the above mentioned relation.

Subsequently, for each of the heating resistors, the amount of density correction is obtained by multiplying the ratio by the difference at the proper desired printed density.

Finally, the print signal corresponding to the amount of density correction is applied to each of the heating resistors so as to drive the heating resistors such that the specific desired printed density is obtained.

BRIEF DESCRIPTION OF THE DRAWINGS

This object and features of the present invention will become apparent from the following description taken in conjunction with the preferred embodiment thereof with reference to the accompanying drawings, in which.

DETAILED DESCRIPTION OF THE INVENTION

Figure 1:
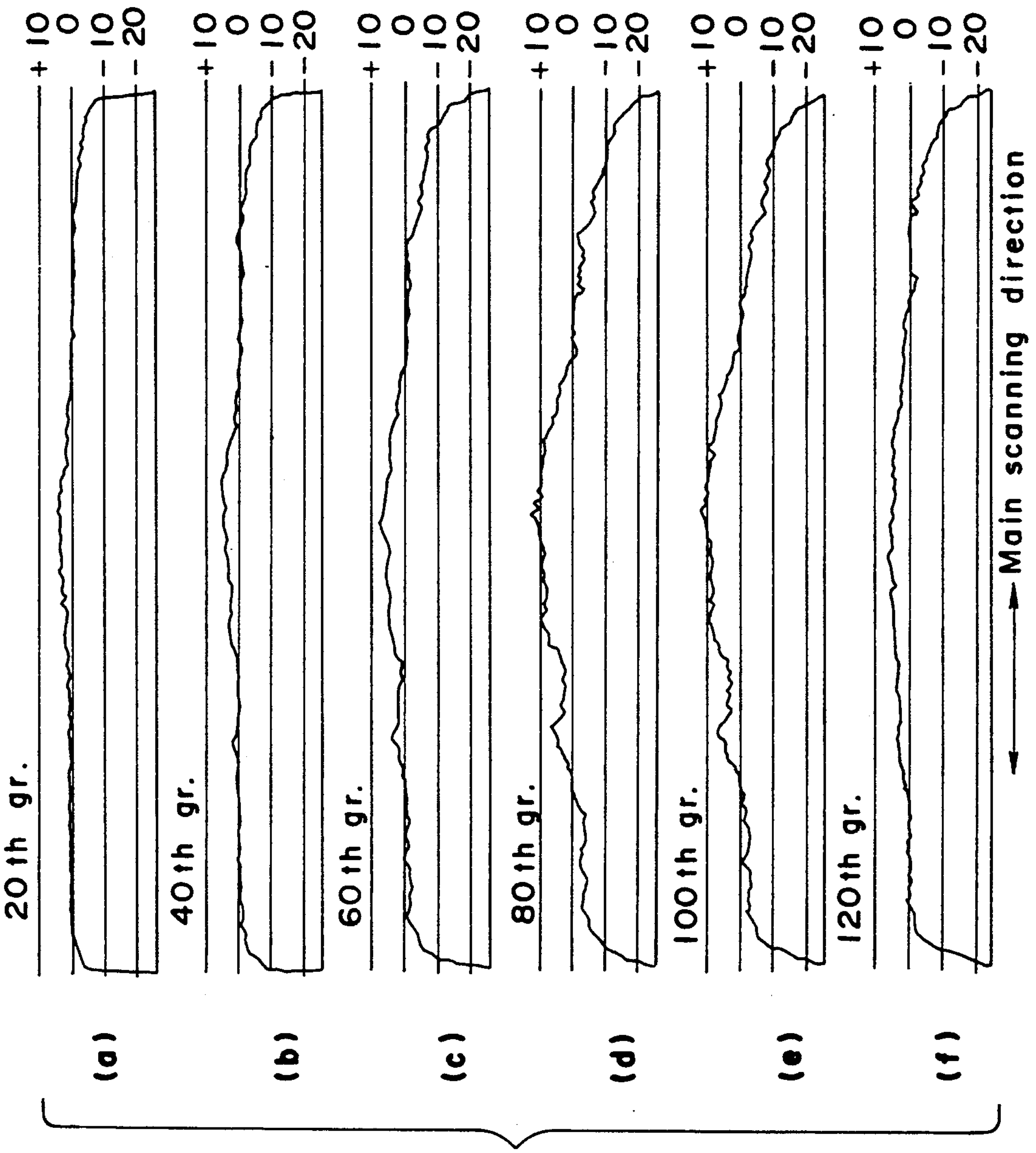
Fig. 1 PRIOR ART
FIGS. 1(*a*) to 1(*f*) are views showing printed density nonuniformities at various printed densities, respectively before density correction (already referred to)
Figure 2:
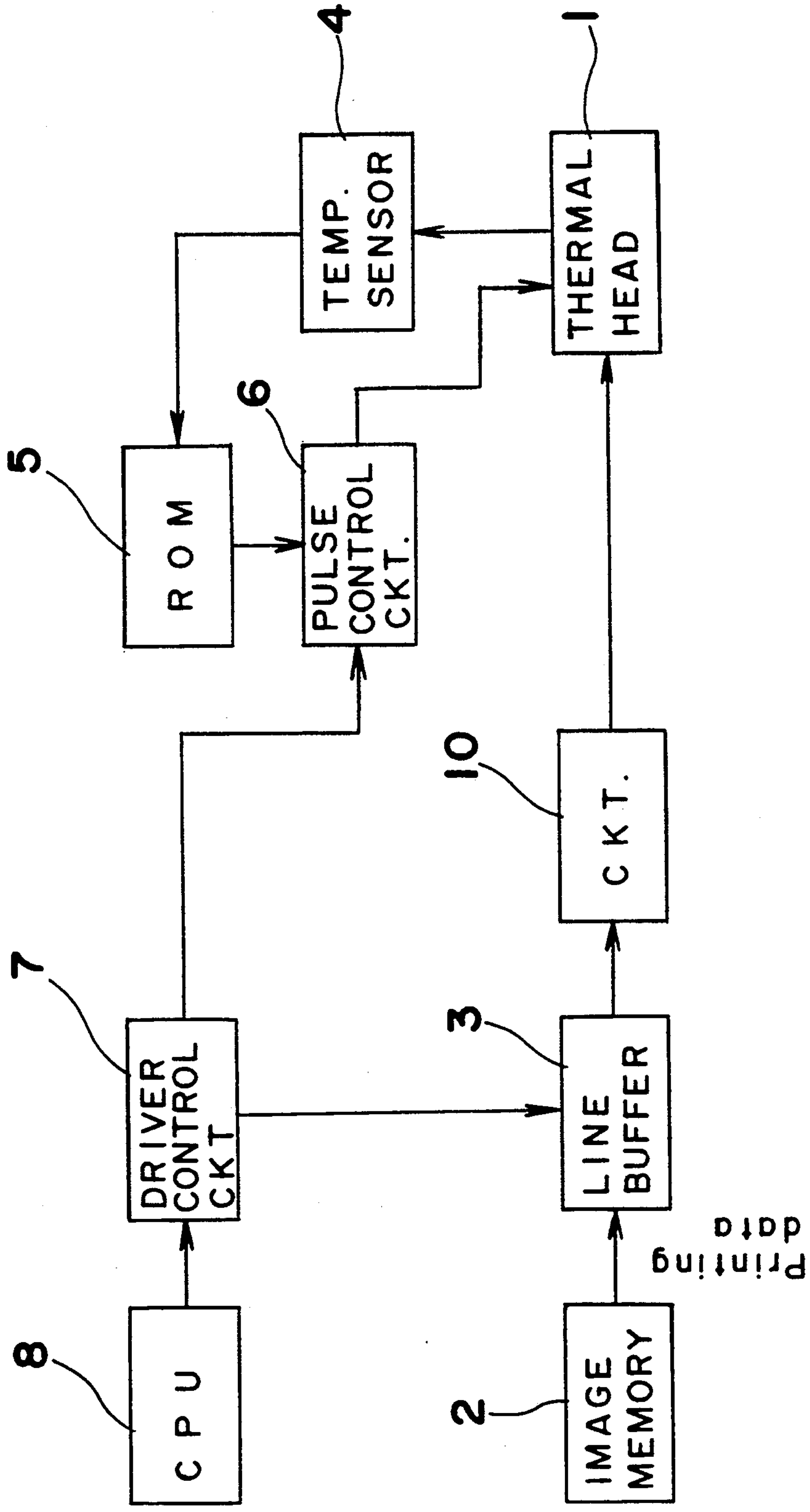
FIG. 2 is a block circuit diagram of a thermal transfer recording apparatus by the use of which a method of controlling printed density, according to the present invention is performed.

Referring now to the drawings, there is shown in FIG. 2, a thermal transfer recording apparatus by the use of which a method of controlling printed density, according to the present invention is performed. The thermal transfer recording apparatus enables multiple gradations, for example, 128 gradations, and includes a thermal head 1 having a plurality of heating resistors arranged in a line, an image memory 2 for storing data of one image, a line buffer 3 for storing data of one line and a circuit 10 for calculating the amount of correction of printed density nonuniformity on the basis of a certain reference gradation. It should be noted that the method of the present invention is mainly concerned with operation of the circuit 10.

The thermal transfer recording apparatus further includes a temperature sensor 4, a density table ROM 5 for storing a density table corresponding to the relation between gradation and applied pulse width at a predetermined temperature in a state of accumulation of no heat in the heating resistors, a pulse control circuit 6 for generating heating pulse signals (strobe signals) which are determined in accordance with the density table so as to be applied to the heating resistors, a driver control circuit 7 for transferring control signals to the line buffer 3 and the pulse control circuit 6 and a central processing unit (CPU 8) for controlling the thermal transfer recording apparatus as a whole.

Figure 3:
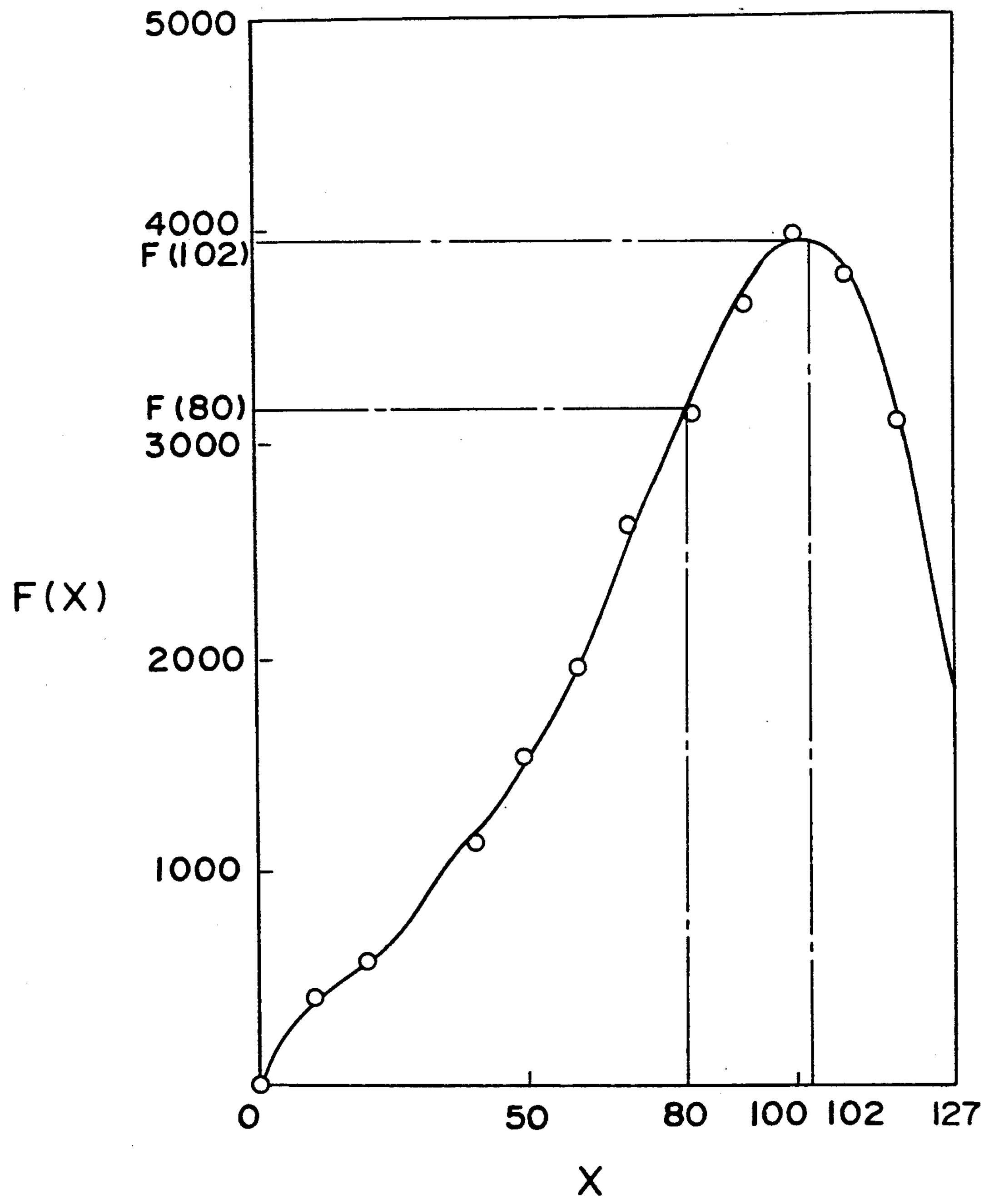
FIG. 3 is a graph showing relation between desired printed density and sum of absolute values of differences between a reference printed density and actual printed densities in the method performed by the apparatus of FIG. 2.

The method of the present invention, which is mainly based on operation of the circuit 10 of FIG. 2, is described with reference to FIGS. 3 to 6, hereinbelow. FIG. 3 shows relation between desired printed density X and the sum F(X) of absolute values of differences between a reference printed density and actual printed densities. Assuming that the thermal transfer recording apparatus enables printing of 128 gradations, the number "50" of the abscissa of FIG. 3 and the indication "20th gr." of FIG. 4(*a*), for example, represent printed densities at the 50th and 20th gradations counted from the lightest gradation, respectively. From FIG. 3, it will be seen that as printed density is increased further, printed density nonuniformity becomes also larger and assumes a maximum at a printed density of the 102nd gradation. When printed density exceeds that of the 102nd gradation, printed density nonuniformity decreases.

Relation of FIG. 3 is expressed by an approximate equation, for example, the following quadratic equation (1).

$$F(X)=a+b\cdot X+c\cdot X^2+d\cdot X^3+e\cdot X^4 \quad (1)$$

In the equation (1), a, b, c, d and e denote constants determined by various conditions of the thermal transfer recording apparatus, respectively.

Figure 5:
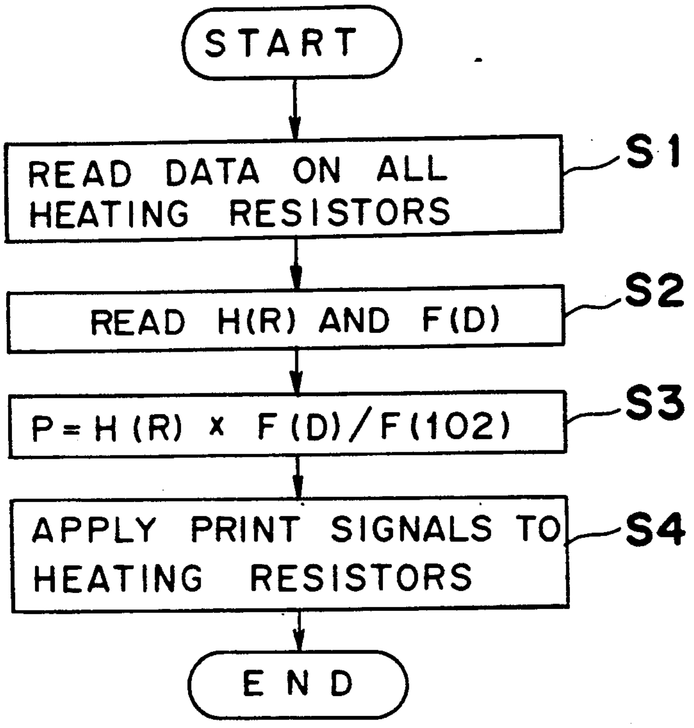
FIG. 5 is a flow chart showing sequence of the method performed by the apparatus of FIG. 2.
Figure 6:
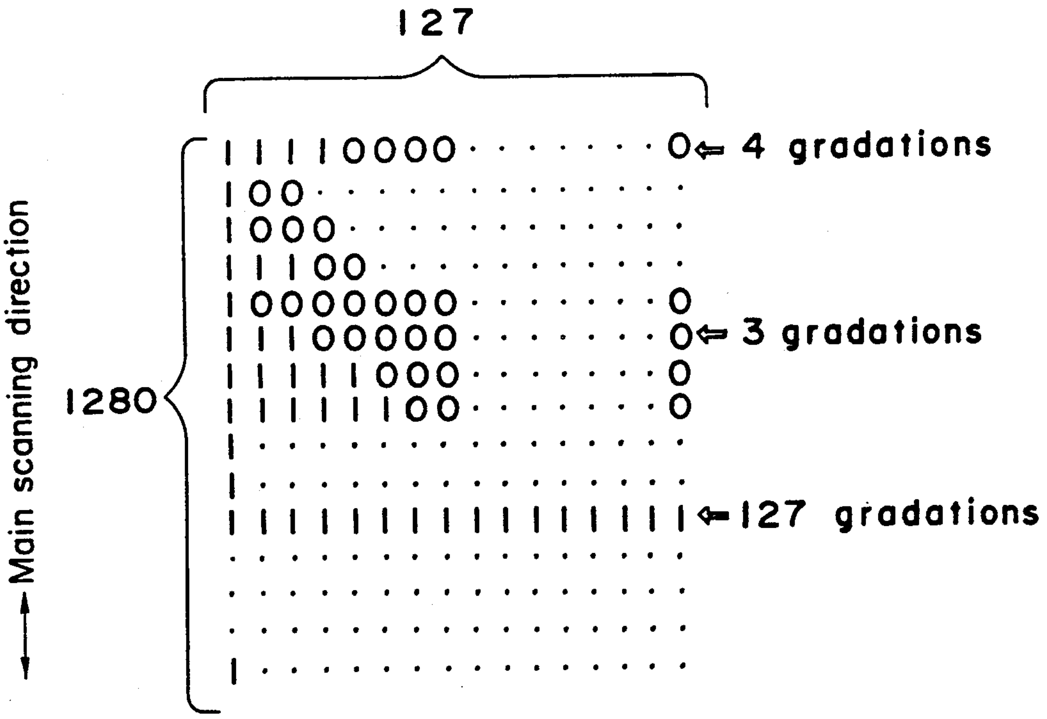
FIG. 6 is a view showing binary data of one line used in the method performed by the apparatus of FIG. 2.

In the present invention, the heating resistors are constituted by one line of 1280 heating resistors and differences H(R) between a reference printed density and actual printed densities for all the above mentioned heating resistors are obtained on the basis of the desired printed density at the 102nd gradation. In the differences H(R), R denotes the number of the heating resistors, respectively. As shown in FIG. 6, binary data of one line applied to the heating resistors in the method of the present invention is formed by a matrix of 1280 rows and 127 columns. Each of the vertical 1280 binary data of each column extending in parallel with a main scanning direction corresponds to one dot, while each of the lateral 127 binary data of each row corresponds to gradation. Meanwhile, the equation (1) and the differences H(R) are stored in the circuit 10. Operation of the circuit 10 is described with reference to the flow chart of FIG. 5. Thus, as shown in FIG. 5, data on all the heating resistors at the reference 102nd gradation is read from the line buffer 3 in the circuit 10 at step S1. Then, at step S2, from data D of an inputted density (inputted gradation) and the numbers R of the heating resistors for receiving this input data D, the differences H(R) and the sum F(D) are read from the circuit 10. For example, when printing is performed at a density of the 80th gradation, an amount P of density correction for the 650th heating resistor in the 1280 heating resistors is given by the following equation (2).

$$H(650):P=F(102):F(80) \quad (2)$$

The equation (2) can be changed as follows.

$$P=H(650)\cdot F(80)/F(102) \quad (3)$$

Figure 4:
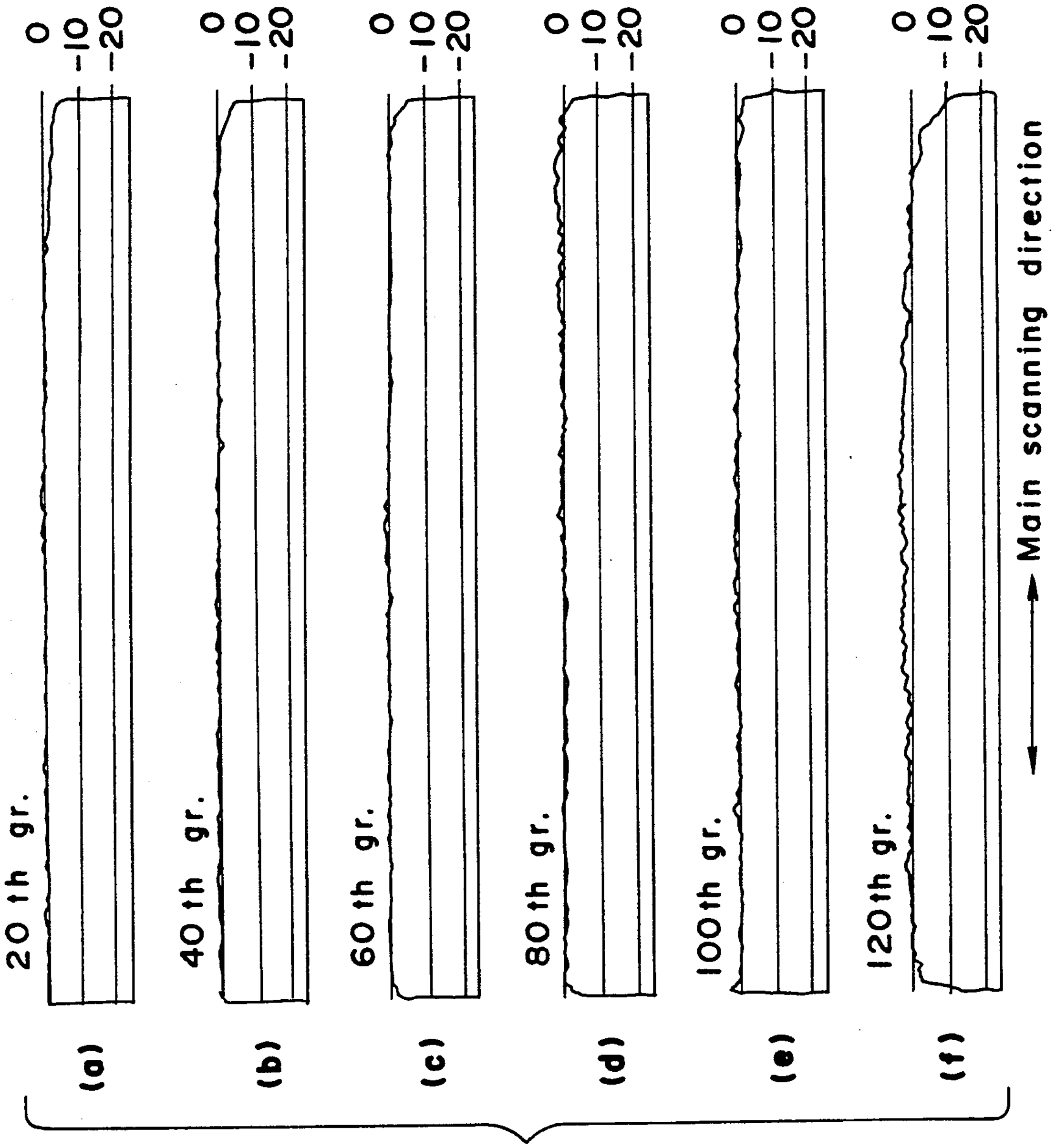
FIGS. 4(*a*) to 4(*f*) are views showing printed density uniformities at various printed densities, respectively after density correction in the method performed by the apparatus of FIG. 2.

Calculation of the equation (3) is performed by an arithmetic processor by calling the equation (1) and the differences H(R) from the circuit 10. Thus, at step S3 in the circuit 10, the amount P of density correction is obtained for all the 1280 dots by using the equation (3): $P=H(R)\cdot F(D)/F(102)$. Subsequently, at step S4 in the circuit 10, the amount P of density correction is added to the data D of the inputted density so as to obtain a print signal and the print signal is applied to each of the heating resistors so as to drive the heating resistors such that printing at uniform density is performed, whereby printed density uniformities at various printed densities are obtained as shown in FIGS. 4(*a*) to 4(*f*), respectively.

In the method of controlling printed density, according to the present invention, printed density at all the heating resistors during printing of uniform density can be made uniform, so that printed density nonuniformity in the main scanning direction on the recording medium can be eliminated.

In the present invention, the differences H(R) are obtained for all the heating resistors on the basis of the desired printed density at the 102nd gradation but the gradation acting as a reference for the differences H(R) may be set to an arbitrary value.

In the method of the present invention, by utilizing the phenomenon that printed density nonuniformities produced by printing at various uniform printed densities, respectively have a substantially similar shape, the amount of density correction for each heating resistor to be used for printing can be obtained by proportional calculation based on actual printing at uniform density.

Accordingly, in accordance with the present invention, printed density can be corrected rapidly at the time of printing and printed density nonuniformities in the main scanning direction on the recording medium can be eliminated.

Furthermore, in the present invention, the third data (H(R) in the embodiment) representing at the specific desired printed density (102nd gradation in the embodiment), the differences between the reference density and the actual printed densities of the heating resistors is obtained. Meanwhile, on the basis of the gradational transfer data without density correction at a plurality of the densities each applied to all the heating resistors uniformly, printing is performed on the recording medium at the densities and the sum of the absolute values of the differences between the reference density corresponding to each of the densities and the actual printed densities of the heating resistors is obtained for each of the densities, so that the first data (F(D) in the embodiment) representing relation between the sum and each of the densities and the second data (arbitrary one of the F(D) in the embodiment) representing the first data at the specific one of the densities are obtained.

Therefore, in accordance with the present invention, since only the third data, the first data and the second data are required to be stored, capacity of the memory may be made small. In addition, when the gradational transfer data without density correction has been inputted, the amounts of density correction for the respective heating resistors can be obtained at any one of the densities by merely performing calculation based on the second data, the third data and the first data.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of controlling printed density by producing a desired printed density in a thermal transfer recording apparatus in which a platen roller and a thermal head having a plurality of heating resistors confronting the platen roller are brought into pressing contact with each other and a recording medium and an ink sheet are overlapped and inserted between the platen roller and the thermal head such that ink of the ink sheet is transferred onto the recording medium, comprising the steps of:

storing a set of first data values with each value of the set representing for each of a plurality of densities a sum of absolute values of differences between a reference density corresponding to each of the said plurality of densities and actual printed densities to be produced by the respective heating resistors, obtaining, by inputting gradational transfer data to said first data, fourth data representing said sum of absolute values at the density of the inputted gradational transfer data;

obtaining an amount of density correction for each of the heating resistors respectively at the gradational transfer data by multiplying third data representing the differences between a specific reference density selected from one of said plurality of densities and the actual printed densities of the respective heating resistors at a specific one of said plurality of densities by a ratio of said fourth data to second data corresponding to one of said set of said first data at the specific one of the densities; and correcting the gradational transfer data by the amounts of density correction so as to drive the heating resistors on the basis of the gradational transfer data subjected to density correction such that transfer recording is performed.

2. A method as claimed in claim 1, wherein said first data and said third data are obtained by performing, on the basis of gradational transfer data without density correction at the densities each applied to all the heating resistors uniformly, printing on the recording medium at the densities.

3. An apparatus for controlling printed density in thermal transfer recording, comprising:

a thermal head unit having a plurality of heating resistors confronting a platen roller to be brought into pressing contact with said platen roller;

an overlapped recording medium and an ink sheet for insertion between said platen roller and said thermal head unit, actuation of a heating resistor transferring ink of the ink sheet onto the recording medium;

memory circuit means for storing gradational transfer data without density correction at a plurality of densities each applied to all the heating resistors uniformly;

means for storing a set of first data values representing a sum of absolute values of differences between a reference density corresponding to each of the plurality of densities and actual printed densities of the respective heating resistors, means for storing third data representing the differences between a reference density corresponding to each of said plurality of densities and actual printed densities of the respective heating resistors at a specific one of the densities.

means for producing second data representing said first data at the specific one of the densities;

means for producing fourth data representing said first data at the gradational transfer data without density correction from said memory circuit means;

means for obtaining amounts of density correction for the heating resistors, respectively at the gradational transfer data without density correction based on said second, third and fourth data; and pulse generating circuit means for applying to said thermal head, a pulse signal determined based on the transfer density.

4. A method of controlling printed density by producing desired printed densities in a thermal transfer recording apparatus in which a platen roller and a thermal head having a plurality of heating resistors confronting the platen roller are brought into pressing contact with each other and a recording medium and an ink sheet are overlapped and inserted between the platen roller and the thermal head such that ink of the ink sheet is transferred onto the recording medium and in which by inputting identical gradational transfer data to the heating resistors, an amount of density correction for each of the heating resistors is obtained in accordance with a difference between each of actual printed densities produced by the respective heating resistors and a density to be obtained by the gradational transfer data such that thermal transfer recording is performed by driving each of the heating resistors o n the basis of the amount of density correction, the method comprising the steps of:

storing data corresponding to the relation between a sum of absolute values of the difference of the heating resistors and each of the desired printed densities;

obtaining, from the relation data and based on the gradational transfer data, fourth data representing the sum of the absolute value of the differences;

obtaining the amount of density correction for each of the heating resistors at the gradational transfer data by multiplying third data representing the differences between a specific reference density selected form one of the desired printed densities and the actual printed densities of the respective heating resistors at the one of the desired printing densities by a ratio of the fourth data to second data corresponding to the relation at the one of the densities; and correcting the gradational transfer data by the amount of density correction so as to drive the heating resistors on the basis of the gradational transfer data subjected to density correction such that transfer recording is performed.

5. A method as claimed in claim 4, wherein the relation is expressed by a polynomial having the desired printed densities as its parameter.

6. A method as claimed in claim 4, wherein said third data is obtained by performing, on the basis of gradational transfer data without density correction at the desired printed densities each applied to all the heating resistors uniformly, printing on the recording medium at the desired printed densities.

7. An apparatus for controlling printed density in thermal transfer recording, comprising:

a thermal head unit having a plurality of heating resistors confronting a platen roller to be brought into pressing contact with said platen rollers;

an overlapped recording medium and an ink sheet for insertion between said platen roller and said thermal head unit, actuation of a heating resistor transferring ink of the ink sheet onto the recording medium;

memory circuit means for storing gradational transfer data without density correction at a plurality of desired printed densities each applied to all the heating resistors;

means for storing, when the gradational transfer data has been inputted to the heating resistors, data corresponding to the relation between each of the desired printed densities and a sum of absolute values of differences between a density to be obtained by the gradational transfer data and actual printed densities produced by the respective heating resistors;

means for storing third data representing the differences at a specific one of the desired printed densities;

means for producing second data representing the relation at the specific one of the desired printed densities;

means for producing fourth data representing the relation at the gradational transfer data without density correction from said memory circuit means; and means for obtaining amounts of density correction for the heating resistors, respectively based on the second, third and fourth data.

8. An apparatus as claimed in claim 7, wherein the relation is expressed by a polynomial having the desired printed densities as its parameter.

9. An apparatus as claimed in claim 7, where the third data is obtained by performing, on the basis of the gradational transfer data without density correction at the desired printed densities each applied to all the heating resistors uniformly, printing on the recording medium at the desired printed densities.

* * * * *